(No Model.) 2 Sheets—Sheet 2.

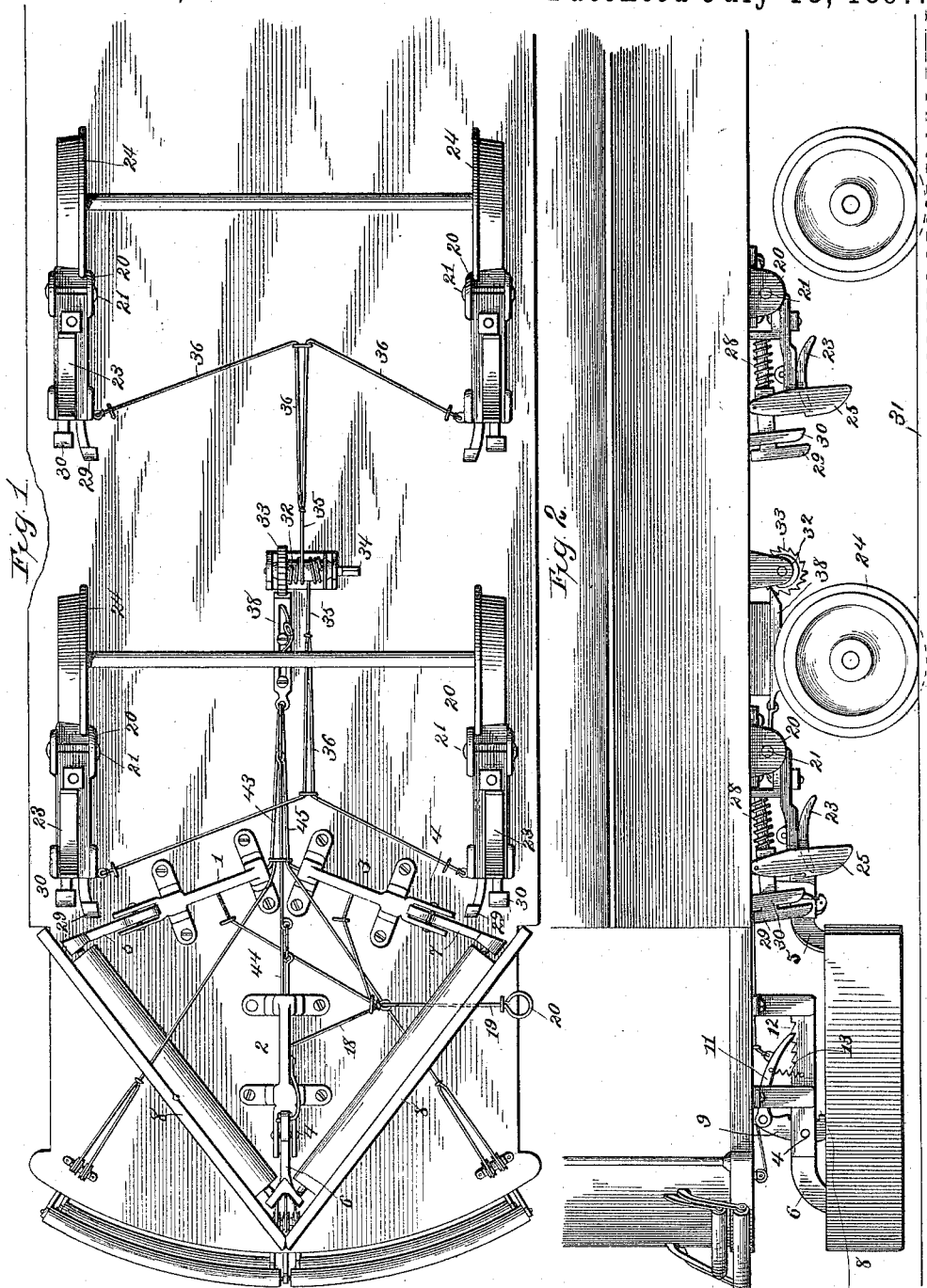

J. J. DOUGHERTY.
COMBINED AUTOMATIC FENDER AND BRAKE.

No. 586,166. Patented July 13, 1897.

Witnesses
E. C. Wurdeman
J. Williamson

Inventor
James J. Dougherty
by Geo. H. Holgate
Attorney

THE NORRIS PETERS CO., PHOTO-LITHO., WASHINGTON, D. C.

UNITED STATES PATENT OFFICE.

JAMES J. DOUGHERTY, OF PHILADELPHIA, PENNSYLVANIA.

COMBINED AUTOMATIC FENDER AND BRAKE.

SPECIFICATION forming part of Letters Patent No. 586,166, dated July 13, 1897.

Application filed February 9, 1897. Serial No. 622,623. (No model.)

*To all whom it may concern:*

Be it known that I, JAMES J. DOUGHERTY, a citizen of the United States, residing at Philadelphia, in the county of Philadelphia and State of Pennsylvania, have invented a certain new and useful Improvement in a Combined Automatic Fender and Brake, of which the following is a specification.

My invention relates to a new and useful improvement in automatic car fenders and brakes for trolley-cars and the like, and has for its object to so construct and arrange devices of this description as to cause a pilot or fender carried in front of the car-truck above the road-bed to be automatically brought into contact or close proximity with the road-bed when meeting with an obstruction, such as a person run down by the car, a further object of this invention being to automatically apply a powerful set of brakes to both the wheels of the car and the track upon which said wheels are running when the fender is operated in order that the car may be stopped.

A still further object of my invention, which is incidental to the above-named objects, is to place under the control of the motorman means for operating both the fender and the brakes, thus enabling him to put the same in immediate operation when occasion requires in conjunction with or independent of the ordinary hand-brake.

With these ends in view this invention consists in the details of construction and combination of elements hereinafter set forth and then specifically designated by the claims.

In order that those skilled in the art to which this invention appertains may understand how to make and use the same, its construction and operation will now be described in detail, referring to the accompanying drawings, forming a part of this specification, in which—

Figure 1 is a bottom plan of a portion of a car having my improvements applied thereto; Fig. 2, an elevation of a portion of the car, showing the fender and brakes in their elevated or inactive position; Fig. 3, a central longitudinal section of Fig. 1, showing the brakes and fender in their active position; Fig. 4, a front elevation of one of these brakes, illustrating their relative position to a rail which is shown in section; Fig. 5, a section at the line $x\ x$ of Fig. 4; and Fig. 6, a detail elevation of one of the fender-arms, showing it locked in its depressed position.

In carrying out my invention as here embodied I secure to the under side of the platform or car the brackets 1, 2, and 3 and pivot in the outer ends thereof at 4, which are forked for that purpose, the arms 5, 6, and 7, respectively, and these arms extend outward and are curved downward and have secured thereto at their outer ends the fender-boards 8, as clearly shown in Fig. 1.

The boards 8, which constitute the fender, stand at an angle to each other, the vertex thereof being upon the longitudinal axis of the car, after the manner of the ordinary pilot, while the rear and outer ends of these boards project beyond the line of the wheels of the truck, in order that an object coming in contact with the fender may be shed sidewise without the line of travel of said truck. Each of the arms has formed therewith the extensions 9, which project upward and have pivoted thereto at 10 the pawls 11, and these pawls are adapted to engage with ratchet-teeth 12, formed upon the brackets, so that when the arms are swung downward the pawls will be drawn forward upon the ratchet-teeth and, engaging therewith, will prevent the upward movement of the arms, and consequently the fender, until they have been released from said teeth, and in order to insure a positive engagement of said pawls with said teeth the springs 13 are connected therewith, which have a tendency to draw the pawls into contact with the teeth. The arms and fender carried thereby are normally held in an elevated position by means of the springs 14, attached thereto at 15 and to the brackets at 16, but these springs are of a tension which will permit the forcing downward of the fender when the latter meets an obstruction, thereby bringing it into closer proximity to the road-bed, and this downward movement is limited by the lugs 17, formed upon the arms and adapted to come in contact with the brackets. From this it will be seen that a car provided with a fender thus constructed cannot pass over a person who may be prostrate upon the track, as the fender, first coming in contact therewith, will be lowered into such close proximity to the road-bed as to preclude the possibility of the person passing thereunder, after which it will shed said person to one side or the other, thrusting him beyond the line of travel of the truck, so that the only injury that can arise to the person struck by the car will be that caused by the force of impact with said car or fender. After the fender has been depressed the pawls will enter into engagement with certain teeth of the ratchets and firmly hold it in this depressed position against the action of its springs, which will prevent the liability of the fender moving upward after the first contact with the person; but when it is desired to restore the fender to its normal position it is only necessary to disengage the pawls from their ratchets to permit the springs 14 to elevate said fender, and this is facilitated by the cords 18, which, passing through suitable guides, are led and attached to said pawls, while their opposite ends are attached at a common point to the rod 19, which terminates in a handhold 20 in easy reach of a person from the side of the car.

In the operation of electric cars it often happens that the hand-brake, with which the motorman is supplied for stopping the car, proves insufficient in cases of emergency, where the immediate stopping of said car is essential to the saving of life, and to overcome this difficulty I have provided a powerful brake for immediate application, either automatically by the action of the fender when coming in contact with an obstruction or by the motorman when the danger is apparent, and this is accomplished in the following manner:

20 are hangers secured to the under side of the car and having pivoted therein at 21 the brake-arms 22, here shown as four in number, and each of these arms has a shoe 23 attached thereto, said shoes being adapted to bear against the peripheries of the truck-wheels 24 after the manner of the ordinary brake-shoe, and each of the arms has formed therewith the guides 25, arranged to embrace the sides of the wheel when being swung into active position, the object of which is to prevent these arms from being sprung sidewise when strain is brought thereon for the application of the shoes to the wheels. Rods 26 and 27 are so placed within the arms as to be guided thereby and are normally held downward by the coil-springs 28 and have secured to or formed with their lower ends the drag-blocks 29 and 30, respectively. The action of these blocks is to bear upon the two surfaces of the rail 31, over which the wheels of the car are passing, and it is therefore obvious that when the arms are swung downward, so as to bring these blocks into contact with the surfaces of the rail, the friction between said rail and blocks will cause the latter to swing rearward relative to the truck-wheels, thereby carrying the shoes 23 into contact with the periphery of said wheels, and as these blocks draw nearer the vertical plane in which the arm is pivoted they will increase their bite upon the rail, thereby increasing the force with which the shoes 23 are forced against the periphery of said wheel, and this, in conjunction with the tension of the springs 28, will so bind the shoes against the truck-wheels as to immediately arrest the forward movement of the car and bring it to a stop, it being noted that while the shoes are retarding the movement of the truck-wheels the blocks, by their frictional contact with the rails, are likewise retarding the forward progression of the car, and these two actions combined will effectually overcome the momentum of said car in an exceedingly short space.

To bring the drag-blocks and brake-shoes into activity, a drum 32 is mounted beneath the car and has thereon a ratchet-wheel 33 and a wrench-hold 34. Cords 35 are secured to said drum, so that when the latter is revolved in the proper direction these cords will be wound thereon and in turn draw upon the cords 36, which, passing through suitable guides, are attached to the brake-arms at 37, thereby elevating said arms to the position shown in Fig. 2, and so long as the drum is held against a reverse rotation these arms will be thus elevated, and to prevent a retrograde movement of the drum a sliding pawl 38 is attached to the under side of the car and the nose thereof normally held in engagement with the ratchet-wheel 33 by the spring 39; but when the brakes are to be applied it is only necessary to withdraw the nose of this pawl from engagement with the ratchet, when the drum, being free to revolve, will be so revolved by the weight of the arms in their downward movement, thus applying the brakes, as before described.

The withdrawing of the nose of the pawl from the ratchet may be accomplished either by the motorman or by the fender when the latter is depressed and is effected by a rod or wire 40, leading from the foot-lever 41 to said pawl, to which it is attached by the link 42, so that when the motorman depresses the upper end of the foot-lever the pawl will be drawn forward, leaving the drum free to revolve, with the result above described, so that the motorman, when becoming aware of the danger of an accident, may immediately apply the automatic brakes and thereafter also apply the hand-brake in the usual manner; but should the motorman not observe the danger and the fender come in contact with an obstruction upon the track it will be depressed, as before described, during which operation one or the other of the cords 43, 44, or 45 will be drawn forward, since they are attached to the extensions 9 of the arms 1, 2, and 3, respectively, and in turn are so connected to the pawl 38 as to withdraw it from engagement with the ratchet-wheel 33, which will release the drum and permit the brake-arms to swing downward into activity, thus not only precluding the possibility of the person passing beneath the car, but also arresting the forward progression of said car to prevent injury to the person by being dragged over the road-bed.

After the automatic brakes have been applied they may be again elevated to their normal position by the application of a suitable wrench to the wrench-hold 34 and the revolving of the drum, which will again coil the cords 35 thereon, so drawing upon the cords 36 as to elevate these arms, where they will be retained by the reëngagement of the pawl with the ratchet-wheel.

Having thus fully described my invention, what I claim as new and useful is—

1. In a car-fender, arms pivoted to the car to swing downward, fender-boards carried by the front ends of the arms, pawls pivoted to the arms, teeth engaged by the pawls to retain the arms in their lowered position and means for holding the arms normally elevated, substantially as described.

2. In a car-fender, brackets secured to the bottom of a car-platform, arms pivoted to the outer ends of the brackets, extensions running upward from the rear ends of the arms, pawls pivoted to the extensions, teeth on the brackets engaged by the pawls, and springs holding the arms normally elevated, and fender-boards carried on the front ends of the arms, substantially as described.

3. In combination, brakes pivoted to a car to swing into operative position by force of gravity, and drag-blocks on the brakes to engage the track and apply the brakes, and springs pressing the drag-blocks into engagement with the track-rails, substantially as described.

4. In combination with a car, brake-arms pivoted therebeneath, brake-shoes carried by said arms, rods attached to and guided by the arms, drag-blocks carried by the lower ends of the rods, and springs for forcing said drag-blocks into contact with the rail, whereby sufficient friction will be generated between the blocks and the rails for the proper application of the brake-shoes to the peripheries of the truck-wheels, as specified.

5. The herein-described combination of the arms 1, 2 and 3 pivoted beneath the car, fender-boards carried by said arms and so arranged as to shed an obstruction with which they may come in contact, springs for holding said arms and boards in an elevated position, pawls carried by said arms adapted to engage with suitable teeth for holding said arms in their depressed position, means for releasing said pawls, brake-arms pivoted beneath the car, brake-shoes carried by said arms, spring-actuated rods also carried by said arms, drag-blocks also carried by the arms, a drum journaled beneath the car, cords attached to said drum and also attached to the arms for the elevation of the latter when the drum is revolved in the proper direction, a ratchet-wheel carried by the drum, a pawl for holding said ratchet-wheel against retrograde movement, suitable cords passing to the fender-arms, and a foot-lever whereby the pawl may be withdrawn from the ratchet by either the depression of the fender or the operation of said lever, substantially as and for the purpose set forth.

6. In combination, brakes pivoted to swing into operative position by force of gravity, a drum journaled on the bottom of a car, cords wound on the drum and attached to the shoes whereby when the drum is revolved in the proper direction the brakes will be elevated, means for normally preventing a retrograde movement of the drum, a fender and means whereby when the fender is lowered the drum will be released and the brakes permitted to fall into position, substantially as described.

In testimony whereof I have hereunto affixed my signature in the presence of the subscribing witnesses.

JAMES J. DOUGHERTY.

Witnesses:
S. S. WILLIAMSON,
JOHN J. FORAN,
JOHN FITZPATRICK.